United States Patent [19]

Yoli

[11] Patent Number: 4,584,162
[45] Date of Patent: Apr. 22, 1986

[54] PIPE PLUG AND REMOTE INSTALLATION EQUIPMENT THEREFOR

[75] Inventor: Alfred H. Yoli, New City, N.Y.

[73] Assignee: Preferred Utilities Manufacturing Corp., Danbury, Conn.

[21] Appl. No.: 363,797

[22] Filed: Mar. 31, 1982

[51] Int. Cl.$^4$ .......................... F16L 55/12; B25B 21/00
[52] U.S. Cl. ....................................... 376/204; 138/89; 81/57.4; 81/57.36
[58] Field of Search .............. 29/253; 81/57.22, 57.24, 81/57.25, 57.35, 57.36, 57.4, 57.41; 138/89, 90, 92, 93, 96 R, 96 T; 248/610; 403/324, 328; 73/40.5 R, 49.1; 376/204, 283; 270/235

[56] References Cited

U.S. PATENT DOCUMENTS

| | | | |
|---|---|---|---|
| 2,179,608 | 11/1939 | Berg et al. | 81/57.22 X |
| 2,256,775 | 9/1941 | Hubbell | 138/89 X |
| 2,299,116 | 10/1942 | Svirskysy | 138/90 |
| 2,644,357 | 7/1953 | Farmer | 81/57.22 X |
| 2,667,139 | 1/1954 | Campbell | 138/89 X |
| 2,750,601 | 6/1956 | Houle | 138/89 X |
| 2,800,242 | 7/1957 | Sauthoff | 220/235 X |
| 2,855,003 | 10/1958 | Thaxton | 138/90 |
| 2,924,246 | 2/1960 | Markel | 138/90 X |
| 3,326,243 | 6/1967 | Augustus | 138/90 |
| 3,491,427 | 1/1970 | Zimmerman et al. | 81/57.24 X |
| 3,541,858 | 11/1970 | Bonczek | 138/89 X |
| 3,860,037 | 1/1975 | Rowe | 138/89 |
| 3,978,892 | 9/1976 | Scodino | 138/90 X |
| 4,250,926 | 2/1981 | Satterthwaite et al. | 138/93 X |
| 4,345,694 | 8/1982 | Chambers | 220/235 X |

FOREIGN PATENT DOCUMENTS

| | | | |
|---|---|---|---|
| 2843080 | 4/1980 | Fed. Rep. of Germany | 81/57.4 |
| 1092636 | 11/1967 | United Kingdom | 138/89 |

OTHER PUBLICATIONS

"F15-00-SD", General Electrical Co., pp. 18, 22 and A-44, FIGURES 9, 13, 93 and 94.
Thaxton, Inc., "Pipe Stoppers" brochure.
"Sealfast" MP and LP Series brochures, Mechanical Research & Design, Inc.
Product literature, Circle Gas & Manufacturing Co.

Primary Examiner—Stephen Marcus
Assistant Examiner—Mark Thronson
Attorney, Agent, or Firm—Curtis, Morris & Safford

[57] ABSTRACT

The plugs are used to close the main steam lines of a boiling-water reactor when the reactor is shut down for maintenance, testing and refueling. The plug utilizes an elongated rubber member which is compressed by axial compression in order to form a seal which will hold the plug in place despite the presence in the steam line of substantial isolation valve test pressures which might force the plug out. Preferably, plates covering portions of the rubber are used to provide a long-lasting solid surface to grip the inside wall of the pipe. A device is provided for the remote installation of the plug so as to minimize the exposure of workers to radioactivity in the reactor vessel. The installation device includes remotely controllable structure for compressing the rubber member of the plug. In one embodiment, the compression structure includes a set of impact wrenches for turning a nut on each of several bolts which are used to compress the rubber member of the plug. In another embodiment, pressurized hydraulic fluid is supplied from a remote pump and is used to drive pistons to compress the rubber member. The installation device is remotely attachable to and detachable from the plug.

33 Claims, 14 Drawing Figures

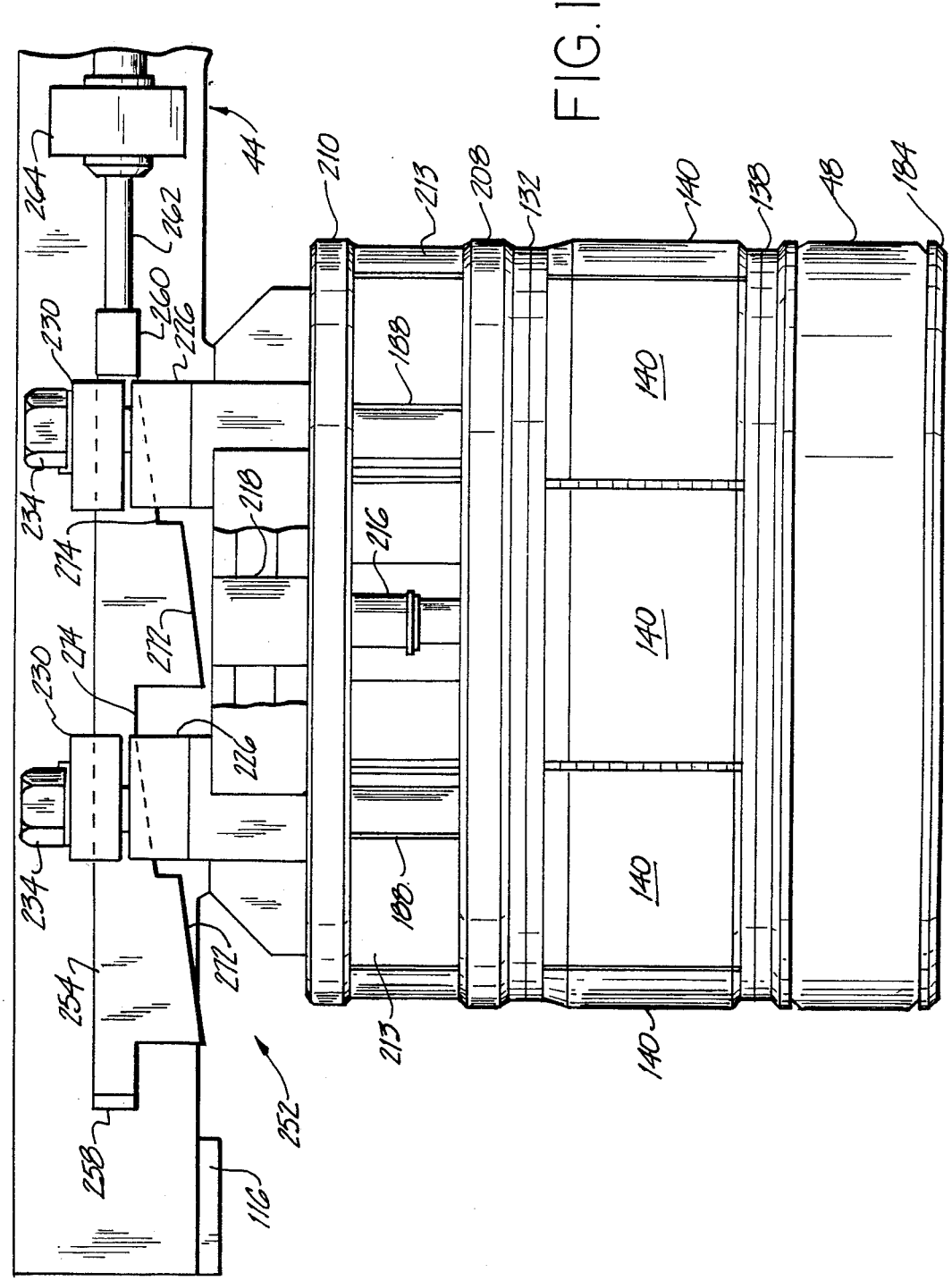

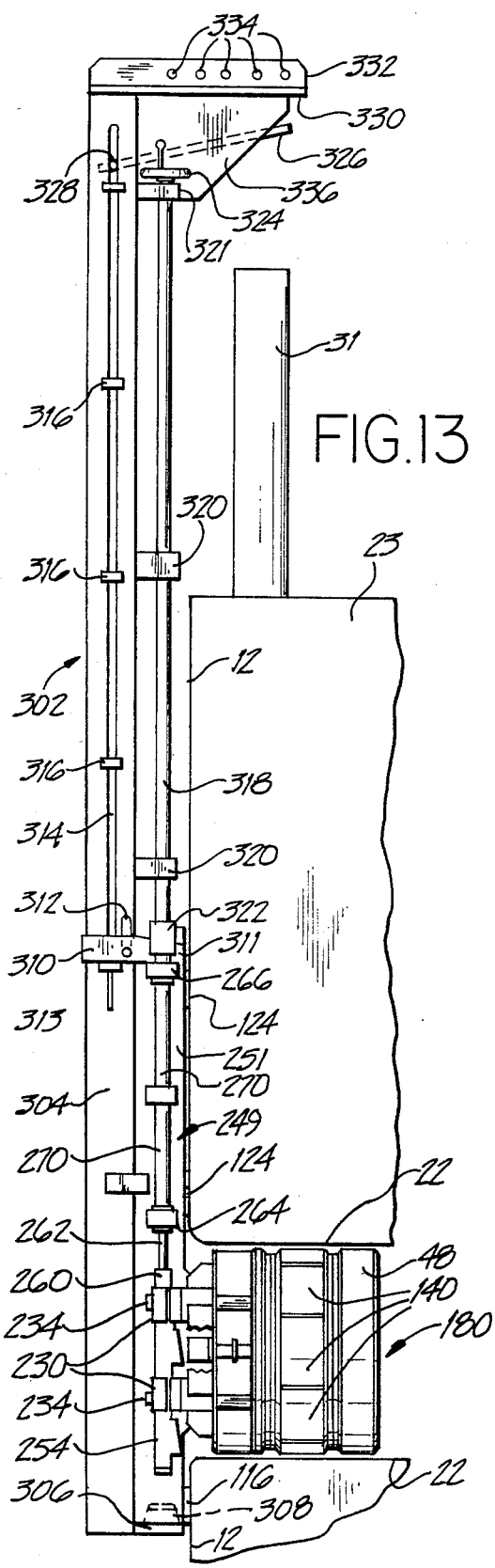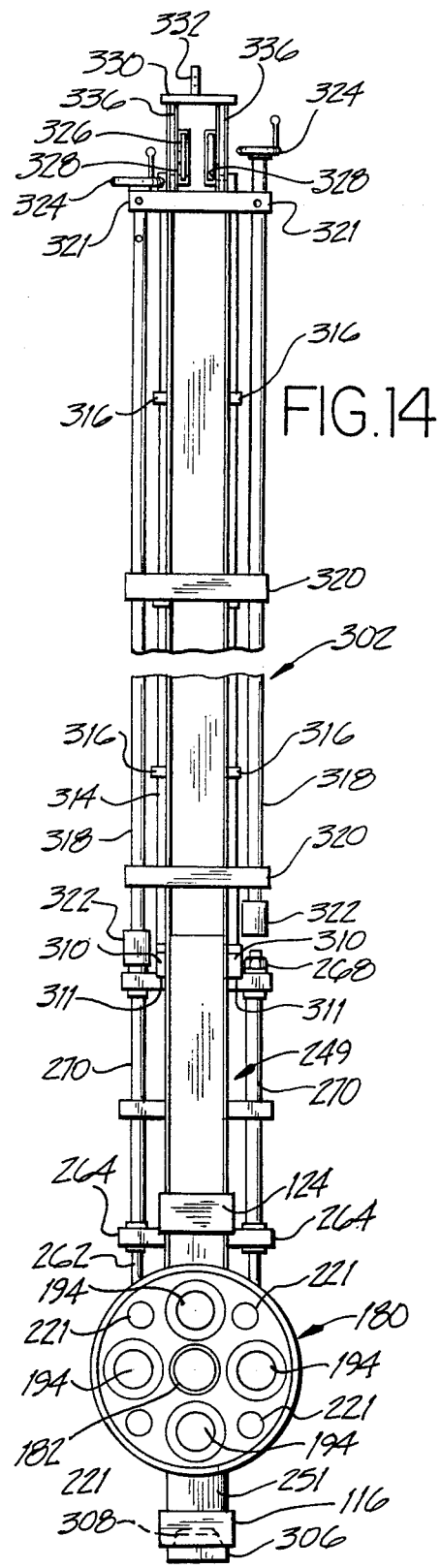

PIPE PLUG AND REMOTE INSTALLATION EQUIPMENT THEREFOR

This invention relates to pipe plugs, and particularly to plugs of the internal expansion variety; more particularly, the invention relates to remotely insertable and removable plugs for the steam pipes in reactor vessels, and to devices for use in remotely installing and removing such plugs.

A common type of nuclear reactor which is used for commercial electrical power generation is the "boiling-water" reactor manufactured by the General Electric Company. Such reactors must be shut down for maintenance and refueling at regular intervals (e.g., twelve to eighteen months). During such periods of shut-down, plugs must be placed in the main steam lines leading from the reactor vessel in order to prevent water which fills the reactor vessel from flowing into the steam lines.

In the main steam lines of a reactor are located two isolation valves in series: one is inside the reactor containment vessel, and one is outside. These valves must be checked carefully for leakage, and often require extensive maintenance work in order to make sure that they will meet the required standards and will function reliably in the future.

The predominant type of plug which has been used to plug reactor steam lines in the past does not permit the application of any significant pressure on the upstream side of the first isolation valve. This has been found to be a disadvantage in the proper testing of the valve. The main reason for this deficiency is that the prior plug uses an inflatable rubber bladder to form a seal within the pipe, and such a seal will not hold the plug in place under the force of the reverse pressure from the steam line. Thus, the pressure is likely to force the plug out of the pipe and cause damage to the reactor.

Another type of plug which has been proposed is resistant to reverse pressures of a moderate level. Such a plug uses opposed frustro-conical mandrels and a rubber O-ring which are squeezed together by one or more bolts. Driving the mandrels towards one another forces metallic curved members outwardly against the inside wall of the pipe to hold the plug in place. However, due to only limited reverse pressure resistance and other shortcomings, such a plug is not believed to have been widely used.

Accordingly, it is an object of the present invention to provide a pipe plug for pipes in nuclear reactors which will remain safely and solidly in place despite the application of substantial fluid pressures in the reverse direction. In addition, it is an object of the invention to provide such a pipe plug which can be installed reliably and accurately from a remote location, so that workmen need not enter the reactor vessel for installation or removal of the plug.

It is another object of the invention to provide an installation device which can be used in the installation and removal of such plugs in the pipes of nuclear reactors by workers located outside the reactor vessel.

It is another object of the invention to provide a pipe plug using a flexible sealing material, such as rubber, for both sealing and holding the plug against fluid pressure forces, while protecting the plug from the adverse effects of aging of the rubber.

It is a further object of the invention to provide such a pipe plug and remote installation device which can be operated safely and reliably under adverse conditions, such as under water, and which are made of corrosion-resistant material.

The foregoing objects are met by the provision of a plug device for closing pipes under pressure in boiling water reactors in which the plug has an elongated plug member made of resilient material which, when compressed in one direction, expands so as to form a seal with the inner surface of the pipe. Preferably, the compression of the plug member also is used to provide holding forces to hold the plug in the pipe despite substantial pressures tending to expel the plug from the pipe. Also, it is preferable that the plug member be compressed by applying forces longitudinally by means of rods or studs interconnecting plates at opposite ends of the plug member so as to pull the plates towards one another to compress the resilient material, or release it to allow the removal of the plug. The forces can be applied to the rods either by turning a nut on the threaded end of each rod, or by applying hydraulic forces to the rods.

The objects of the invention also are met by the provision of a pipe plug having a compressible plug member which has a plurality of relatively rigid members secured to its exterior so as to give a stable, rigid, age-resistent gripping surface to grip the inner wall of the pipe and hold the plug in place reliably despite aging of the material of the plug member. Preferably, the rigid members do not cover the whole surface of the plug member, so that part of the plug member forms a seal with the pipe wall.

Another desirable feature of the pipe plug of the invention is a remote release mechanism which allows the lock holding the plug in compression to be released remotely in case the means normally used for this purpose is disabled.

A remote installation and removal device is provided. The device includes means, operable by workmen standing above the interior of the reactor pressure vessel, for holding the plug in a horizontal alignment for insertion and/or removal of the plug from the main steam lines within the vessel. Remotely-controllable fastening means are used to attach the plug to the installation device and to detach the plug from the device. In one specific embodiment, a motor-driven tool is attached to the installation device near the plug. The tool is remotely engageable with and disengageable from nuts to be driven to tighten or loosen the plug in the pipe. In another specific embodiment, the device has no motor-driven tool, but has means for remotely locking and unlocking the plug member.

The foregoing and other features, objects and advantages of the invention will be more fully set forth in and/or apparent from the following description and drawings.

In the drawings:

FIG. 11 is a side elevation view of a locking device for locking the plug of FIGS. 7 and 8 in place, with the locking device in an unlocked position;

FIG. 13 is a side elevation view of an installation device for use in installing the plug of FIGS. 7 and 8; and FIG. 14 is a rear elevation view of the device shown in FIG. 13.

GENERAL DESCRIPTION

Figure 1:
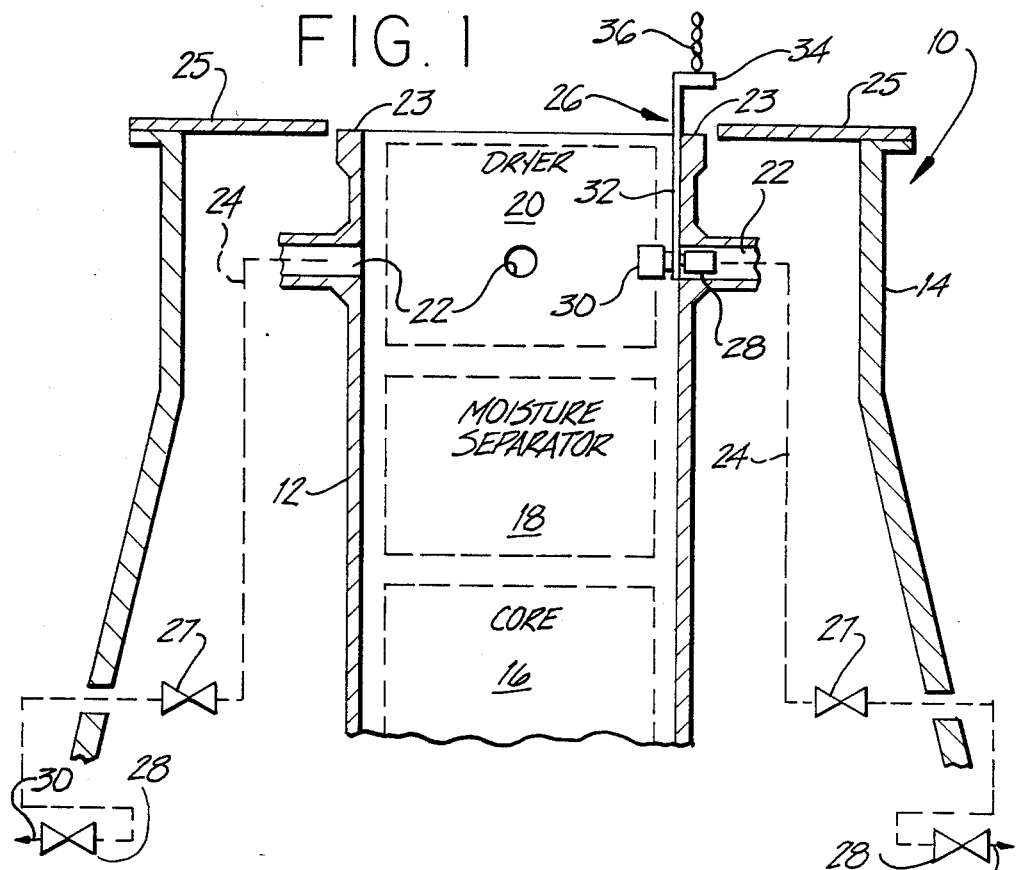
FIG. 1 is a partially schematic and partially cross-sectional view of a boiling water nuclear reactor vessel, partially dismantled for refueling and testing, and showing a pipe plug and installation device of the present invention in position for use.

FIG. 1 is a schematic cross-sectional drawing of a boiling water nuclear reactor 10 which has been partially dismantled for refueling and testing. The reactor 10 includes a reactor pressure vessel 12 within a containment vessel 14.

The pressure vessel 12 normally has a hemispherical head (not shown) which is secured to the flange 23 of the pressure vessel 12. (Studs for attaching the head to the flange have been omitted from FIG. 1, but one such stud 31 is shown in FIG. 13). The head has been removed in order to give access to the interior of the pressure vessel 12. A platform 25 is provided around the periphery of the pressure vessel 12 at the flange 23 for workmen to stand upon.

Within the pressure vessel 12 is located the reactor core 16, a moisture separator 18, and a steam dryer 20. These components are shown in dashed outline because one or more of these components (especially the dryer 20) normally will have been removed from the pressure vessel 12 when it is dismantled for refueling and maintenance purposes.

As it is well known, the pressure vessel 12 normally is filled to a certain level with water. This water boils due to heat generated in the core 16 and this creates steam. Most of the moisture in that steam is removed in a separator 18, and the remaining moisture is removed by the dryer 20. The dry steam then leaves the pressure vessel 12 through inlets 22 to four main steam lines 24.

The steam travels through each line 24 through two isolation valves 27 and 28, one located within the containment vessel 14, and the other outside of the vessel 14. The steam then continues through a line 30 to steam turbines (not shown) which are driven to generate electricity, or to other means for utilizing the steam.

During refueling and maintenance of the reactor, it is necessary to test the isolation valves 27 and 28 to make sure that they meet pre-determined standards for leakage and other characteristics. During the refueling procedure, it also is necessary to remove spent fuel elements from the core 16 by lifting them upwardly from the pressure vessel 12. In order to shield workmen from radiation, such elements must be kept under a substantial depth of water at all times. Therefore, when removing the elements, the entire pressure vessel 12 must be filled with water, and a relatively deep pool of water must be created above the pressure vessel 12. The spent elements then are removed upwardly through the pool, through temporary canals, and into remote storage pools.

The water filling the pressure vessel during refueling cannot be allowed to reach the isolation valves 27 and 28 when maintenance is being performed on the valves, and thus cannot be allowed to enter the steam lines 24. However, the entrances 22 to the steam lines are smooth and unthreaded, so that a simple threaded plug cannot be used to stop up the steam lines. In fact, the internal surfaces of the entrances 22 to the steam lines must be protected against marring or mistreatment of any kind, in order to minimize corrosion and other problems. Therefore, any plug used to plug the steam lines should be able to keep the water out without marring or injuring the internal surfaces of the steam line entrances 22.

Another problem is created by the test procedure most desirable for use in testing the isolation valves 27 and 28. It is highly advantageous to test the isolation valves with a relatively high air pressure applied to the upstream side of each valve. By testing the valves with pressure applied to the upstream sides, it is believed that better test results are obtained and unnecessary maintenance and repair is avoided. Plugs used in the past have not uniformly permitted such testing.

The pipe plug which has been in most prevalent use in closing the steam lines is one made by the General Electric Company which uses an inflatable rubber bladder, and which has been described briefly above. Such a plug keeps water out of the steam lines, but does not permit pressurizing of the steam lines 24 between the first isolation valve 27 and the steam line entrance 22. What happens when any substantial amount of air pressure is applied to the line 24 is that the plug slips out of the pipe opening 22, and sometimes will be hurled into the pressure vessel, striking the opposite side wall of the vessel, and scattering parts down into the reactor components beneath it, including the reactor core. Retrieval and repair operations to correct the situation can be disastrously expensive.

Another prior art plug, also described briefly above, does permit the application of some pressure to the line 24. Such a plug utilizes two opposed frustro-conical mandrels forced together by one or more bolts to spread apart a plurality of shoes to hold the plug in place against pressure. An "O" ring forms a pressure-tight seal. This plug has not generally been satisfactory for several reasons. First, for larger size reactors and steam pipes, the plug does not withstand sufficiently high pressures. Secondly, the plug is difficult to install, and may well require workmen to enter the reactor vessel to install it. For these and other reasons, such a plug has found only limited utility in the industry.

The pipe plug of the present invention which solves the foregoing problems is shown at 28 in FIGS. 1 through 4. In FIG. 1 the plug 28 is shown in place in one of the main steam line inlets 22, whereas the other three steam lines (only two of which are shown in FIG. 1) are empty. It should be understood that ultimately identical plugs would be placed in each of the four steam line inlets 22.

Figure 2:
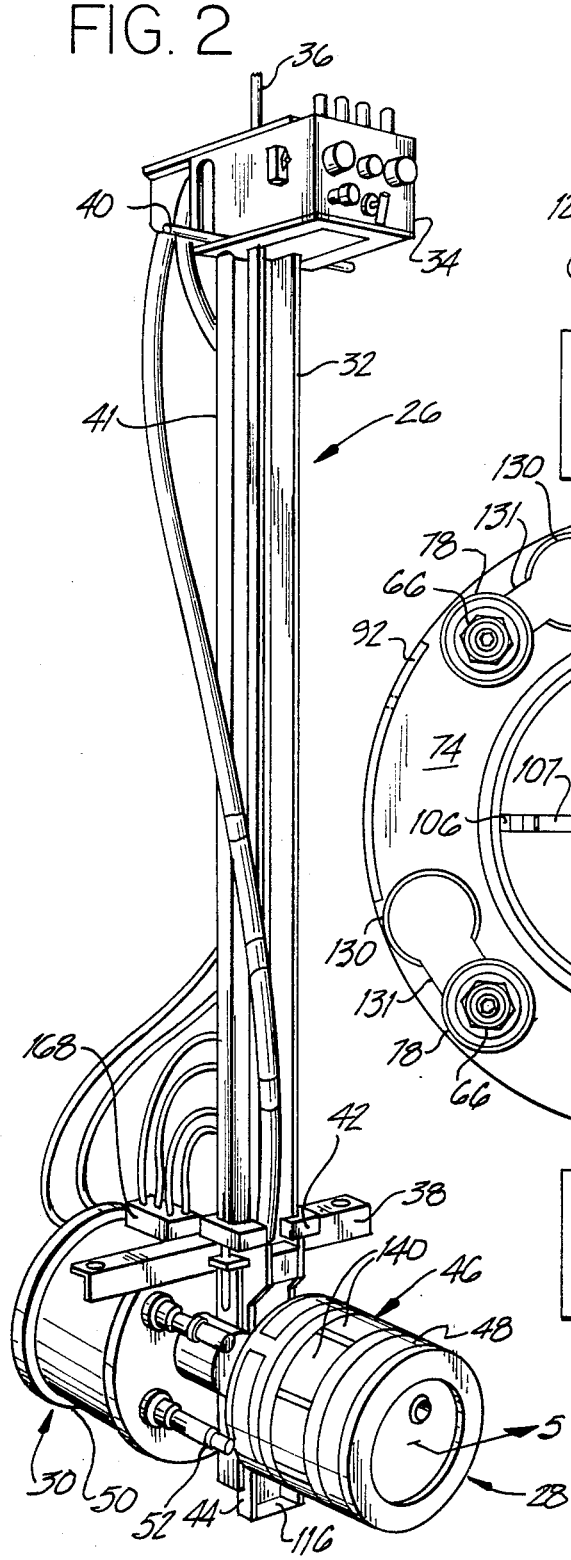
FIG. 2 is a perspective, partially broken-away view of an embodiment of the pipe plug and installation device of the present invention.

The plug 28 is shown in FIGS. 1 and 2 attached to an installation and removal device 26 which allows the plug 28 to be installed and removed by workmen standing on the platform 25, which is from five to nine feet above the pipe inlets 22. Referring particularly to FIG. 2, the installation device 26 includes a vertical beam 32, and a control module 34 at the upper end of the beam 32. A chain or cable 36 is hooked at the top of the device. An overhead power winch raises and lowers the unit 26 by means of the chain 36.

Secured to the lower portion of the beam 32 is a power drive unit 30 which has the capability of remotely tightening nuts on the plug 28 to seal it in the pipe inlet 22. The unit 30 includes a water-tight housing 50, and four socket drives 52. The engagement of the socket drives with the nuts on the plug 28 to install the plug will be described in detail below.

A cross-beam 38 also is secured to the beam 32 for use in assisting in the insertion of the plug 28 into the pipe inlet 22. This can be accomplished, if necessary, by workmen standing on the upper left-hand portion of the platform 25 (FIG. 1) and pushing on the beam 38 with long poles.

Figure 3:
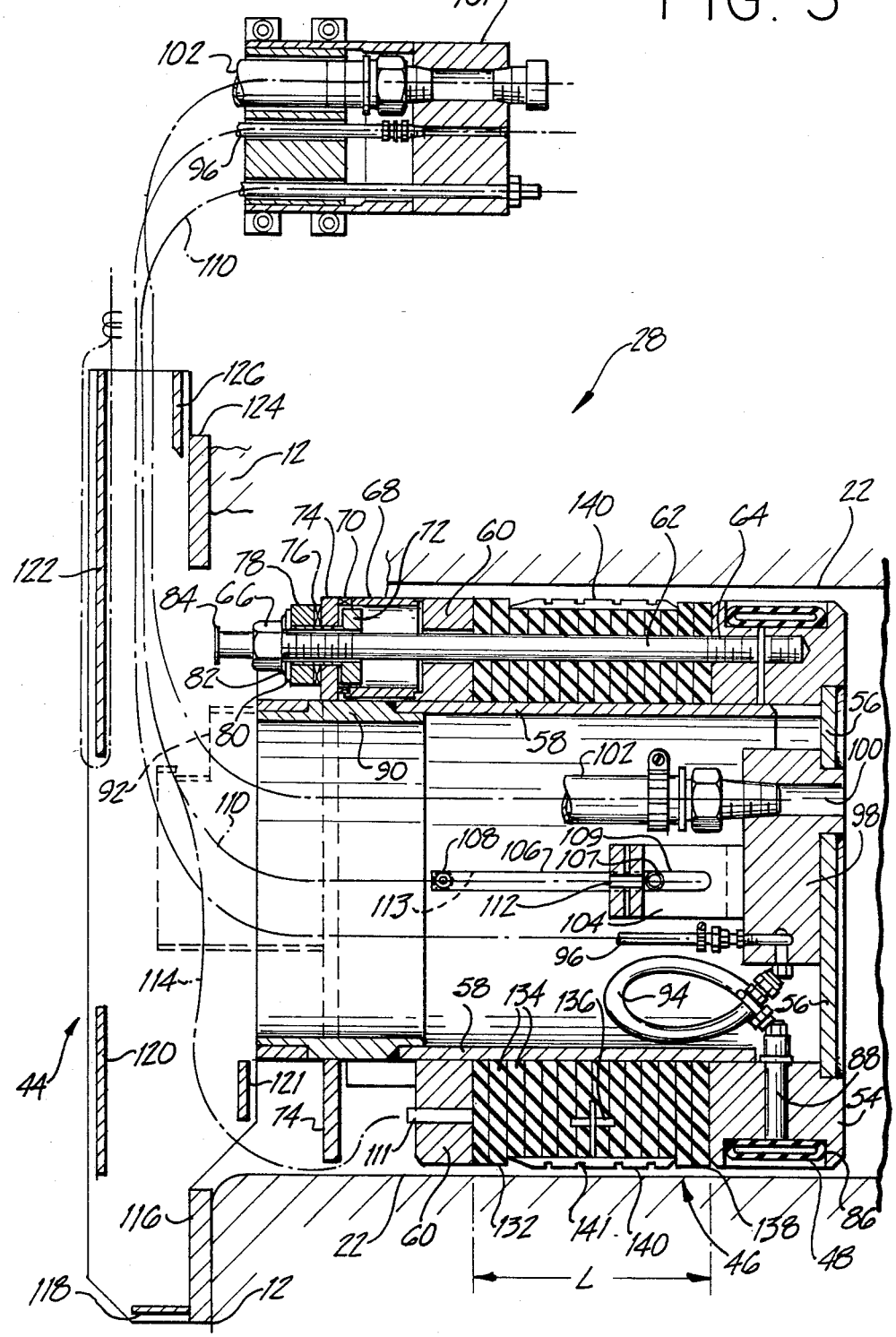
FIG. 3 is a cross-sectional view, taken along line 3—3 of FIG. 4, of a pipe plug constructed in accordance with the present invention.

The plug 28 is releasably attached to the installation device 26. A mounting member 44 is permanently attached to the left end of the plug 28 (as shown in FIG. 3). A hook (not shown in FIG. 2 but described in detail below) is provided at the bottom of the beam 32 and engages with a portion of the member 44. The upper portion of the member 44 is engaged by a pair of arms or projections 42 which can be raised to release the member 44, and lowered to embrace the member 44. This is done by means of a vertical rod 41 with a handle 40 which is operable by an operator standing on the platform 25. By this means, the installation device 26 can be removed remotely, and used for the installation of other plugs. Later, when the plugs are to be removed, the device 26 can be lowered in place and attached remotely to the plugs so as to facilitate their removal. The remote operability of the device 26 makes it unnecessary for the workmen to enter the vessel 12.

The ability of the unit 26 to operate under water is significant in that work often is to be done when the vessel 12 is filled with water, in order to provide further protection of workmen from radioactivity.

The ability of the plug of the present invention to be installed and removed remotely also is significant because it avoids the necessity of workmen descending into the pressure vessel 12 and thus receiving much higher doses of radioactivity than they would otherwise. This means that the workmen can work near the reactor for longer periods of time without the danger of excessive accumulation of radioactivity. The ability of the unit to operate under water enhances this advantage.

PIPE PLUG CONSTRUCTION

Figure 4:
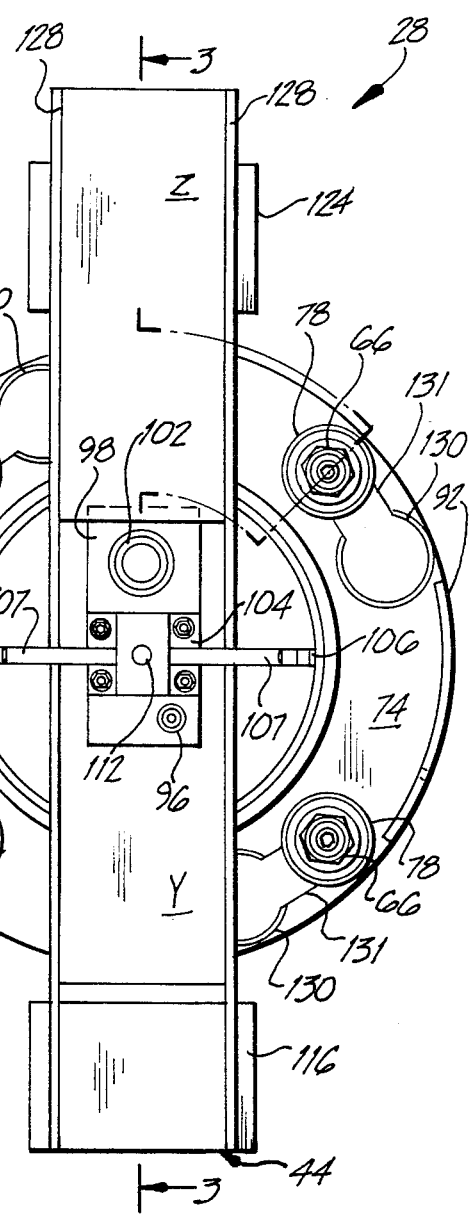
FIG. 4 is an end elevation view of the pipe plug shown in FIG. 3.

The details of the construction of the pipe plug 28 are best shown in FIGS. 3 and 4, as well as in FIG. 2.

Referring now to FIG. 3, the pipe plug 28 includes a rear end plate 56 welded to an end ring 54, and front ring 60. A cylinder 58 of a diameter slightly smaller than the end rings 54 and 60 is fitted into the end rings and is secured to the end ring 54 by means of bolts (not shown).

Located between the end rings 54 and 60 is an expandable sealing and clamping member made of a plurality of rubber rings 132, 134 and 138 abutting one another so as to form an essentially solid body 46.

Secured to the outer periphery of the body 46 are several arcuate plates or shoes 140 (also see FIG. 2) which, together with the rubber rings, form the compressible sealing and holding member 46. Each of the plates 140 extends only a portion of the way around the periphery of the body 46, and is anchored into the rubber by means of metallic cross-pin structures 136 (FIG. 3) which are welded to the undersides of the plates 140.

Figure 9:
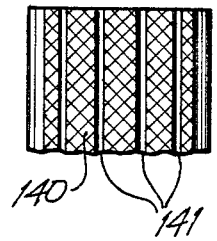
FIG. 9 is an elevation view, partially broken away, of an element of the pipe plugs shown in FIGS. 1-4 and 6-8.

As it is shown in FIG. 9, each of the plates or shoes 140 has a knurled outer surface and a plurality of circumferential grooves 141 which prevent the formation of a water film between the shoes 140 and the interior wall of the pipe. This assures good metal-to-metal contact and thus assures that the plug will be held securely in place. Preferably, there are eight of the plates which are separated slightly from one another circumferentially.

As it is shown in FIG. 3, the plates 140 are substantially narrower than the rubber body 46. Furthermore, the end rings 132 and 138 beyond the edges of the plates 140 are of a slightly larger diameter than the other rings 134 which are directly beneath the plate 140.

Still referring to FIG. 3, as well as to FIG. 4, four chrome-plated steel threaded studs 62 are inserted through the holes in the front ring 60 and the rubber rings, and are threaded into threaded holes in the rear ring 54. Each stud 62 has a nut 66, with a screw and washer combination 84 extending outwardly from one end and serving as a retainer to keep the nut 66 from falling off of the stud 62.

Welded to the front ring 60 are four cylindrical stubs 68, each of which is located so as to surround the shaft of the stud 62. Seated in a recess at the left end of the stub 68 is a thrust-washer 70. A collar 72 with a sleeve portion surrounds the shaft 62 and bears against the washer 70. The sleeve portion of the collar 72 is welded to a spacer 78.

Located between the spacer 78 and the right-hand portion of the collar 72 are a release plate 74 and a thrust washer 76. The release plate 74 provides a means for releasing the compression of the rubber member 46 to facilitate removal of the plug 28 if the nuts 66 are frozen and will not turn on the studs 62, or for some other reason the plug cannot be removed by turning the nuts 66. A pair of washers 80 and 82 is located between the nut 66 and the spacer 78. A further cylindrical member 90 is welded to the cylinder 58, and two projections 92 are welded to the release plate 74 for purposes to be described below.

The studs 62 and the holes through which they pass are dimensioned so that, as the nuts 66 are turned, the studs slide through the holes in the front ring 60, the collar 72, etc., thus causing the compression or de-compression of the rubber material of the plugs. As the nuts 66 are tightened, the rubber of the member 46 bulges outwardly, powerfully thrusting the plates 140 outwardly into contact with the inside wall of the pipe inlet 22 into which the plug 28 has been inserted.

Figure 6:
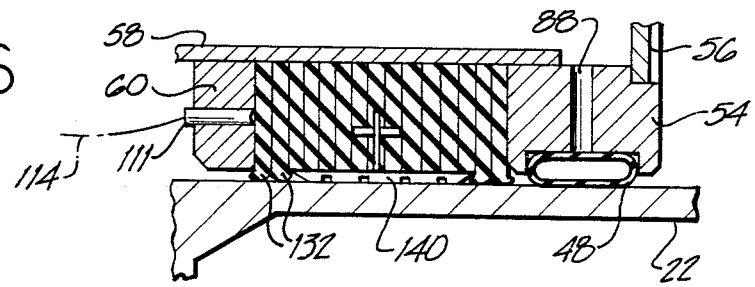
FIG. 6 is a cross-sectional view of a portion of the plug shown in FIG. 3, with the flexible plug member fully expanded after installation in a pipe.

In FIG. 3, the plug 28 is shown in its uncompressed state in which its diameter is somewhat less than the inside diameter of the pipe 22, and the plug makes no contact with the pipe. FIG. 6 shows a part of the plug after the rubber has been compressed. The outer-most rubber rings 132 and 138 bulge outwardly into contact with the walls of the pipes 22 and form a tight seal. The rubber similarly pushes out the plates 140 so that they make intimate contact with the wall of the pipe inlet and hold the plug in place against fluid pressure applied to the right end of the plug. Of course, the rubber elements 132 and 138 also help hold the plug in place against such pressures.

The plug 28 also has an inflatable rubber seal 48 (see FIGS. 3 and 6) which can be inflated remotely by air pressure applied through a conduit 88, and hoses 94 and 96 which communicate through a manifold 98. The compressed air necessary to inflate the rubber seal 48 is supplied remotely through an inlet in a mounting block 101 (see upper portion of FIG. 3) located on the platform 25 (FIG. 1) near where the workmen are working. The upper portion of the hose 96 is shown in dashed lines, and actually is considerably longer than indicated in FIG. 3.

The inflatable rubber seal 48 makes intimate contact with the inside of the pipe inlet 22 and provides a seal in addition to that provided by the compressed solid rubber sealing member. It should be emphasized, however, that, under most circumstances, the seal provided by the member 46 is adequate, and that the inflatable rubber seal 48 is used merely for safety.

Still referring to FIG. 3, a rubber hose 102 is connected through an opening 100 in the manifold 98 to the interior of the pipe to the right of the plug 28. The hose 102 is connected to the block 101 at the upper portion of FIG. 3 and provides a vent to equalize fluid pressures on both sides of the plug, when this is desired. Thus, the venting of the plug also can be controlled remotely.

RELEASE PLATE

Referring now to FIG. 4, as well as FIG. 3, the release plate 74 has four large holes 130 connected by a narrower passageway 131 to the smaller hole through which each of the studs 62 normally passes. The projections 92 which extend perpendicularly outwardly from the plate 74, can be contacted with a rod or beam, or some similar elongated member wielded by a workman on the platform 25. By means of the rod or beam, the projections can be struck in order to rotate the release plate 74 counterclockwise relative to the studs 62 (as seen in FIG. 4) and bring the stubs 68, the nuts 66 and studs 62 into alignment with the large holes 130. This allows the nuts to pass through the spacer plate under the urging of the compressed rubber member 46. This relieves the pressure on the rubber member, loosens the plug and allows it to be removed from the pipe. Thus, the release plate 74 provides a unique fail-safe feature which is so important in nuclear reactors.

PLUG SUPPORT MEMBERS

Referring again to FIG. 3 as well as FIG. 4, the support member 44 is welded to the support cylinders 90 and 58. The member 44 consists of a beam 128 with an upper keeper plate 126 (FIG. 3), an upper stop plate 124, front plates 122 and 120, a bottom support plate 118, and a lower stop plate 116, as well as a rear support plate 121. These components cooperate with mating components of the remote installation device 26 so as to enable the plug 28 and installation device 26 to be coupled and uncoupled by workmen on the platform 25. The stop plates 116 and 124 butt against the internal wall of the pressure vessel 12, thus helping to align the plug 28 in the pipe inlet 22, and restrain the plug against movement into the pipe under the pressure of water in the pressure vessel.

REMOTE COMPRESSION INDICATOR

In accordance with another aspect of the present invention, a remote indicator is provided in order to indicate the extent to which the rubber member 46 has been compressed so as to avoid excessive or insufficient compression to form a seal.

Referring again to FIGS. 3 and 4, the indicator device includes a bracket 104 which is mounted on the manifold block 98, which is secured to the rear plate 56 of the plug 28. A bar 107 spans the interior of the cylinder 58. Secured at each end of the bar 107 is an extension rod 106 whose left end is secured by means of a screw 108 to the ring 60 through a slot 113. The bar 107 slides in a slot 109 in the bracket 104 and is connected in its center to the slidable wire internal member of the flexible control cable 110 whose outer sheath is secured in a hole 112 in the bracket 104. Because it is coupled to the ring 60, the bar 107 moves back and forth in the slot 109 as the rubber seal member 46 is compressed or decompressed. Since the bracket 104 is fastened to the rear wall 56, it does not move. The result is that the wire of the cable 110 moves a distance proportioned to the compression or de-compression of the rubber member 46. This measurement is proportioned to the average amount of compression of the rubber around its circumference.

The cable 110 extends up to the remote block 101, where workmen can seen the amount of movement of the cable, and, therefore, the degree of compression of the seal member 46.

A transducer 111 for use in an alternative embodiment of the remote indicator feature of this invention is illustrated in FIG. 3. The transducer 111 is fitted into a hole in the ring 60 with its right end in contact with the left end of the rubber plug member 46. There is one such transducer adjacent each of the four studs 62, but only one transducer is shown in FIG. 3, in order to simplify the drawings. Each transducer has a diaphragm at one end and has the ability to convert pressure of the compressed rubber 56 into an electrical signal whose value is proportional to the degree of compression of the rubber. The transducer may be a "Sensotec" subminiature pressure transducer, Type S, by Sensotec, Inc., Columbus, Ohio, or one of several other devices commercially available for this purpose. The transducer should be waterproof.

A waterproof electrical lead 114 follows the path of the cable 110 and supplies an electrical indication signal indicating the rubber compression at each of the four studs.

This embodiment of the invention has the advantage that it provides a separate indication of the degree of tightening of each of the four nuts 66, whereas the device described previously does not.

REMOTE INSTALLATION DEVICE

Figure 5:
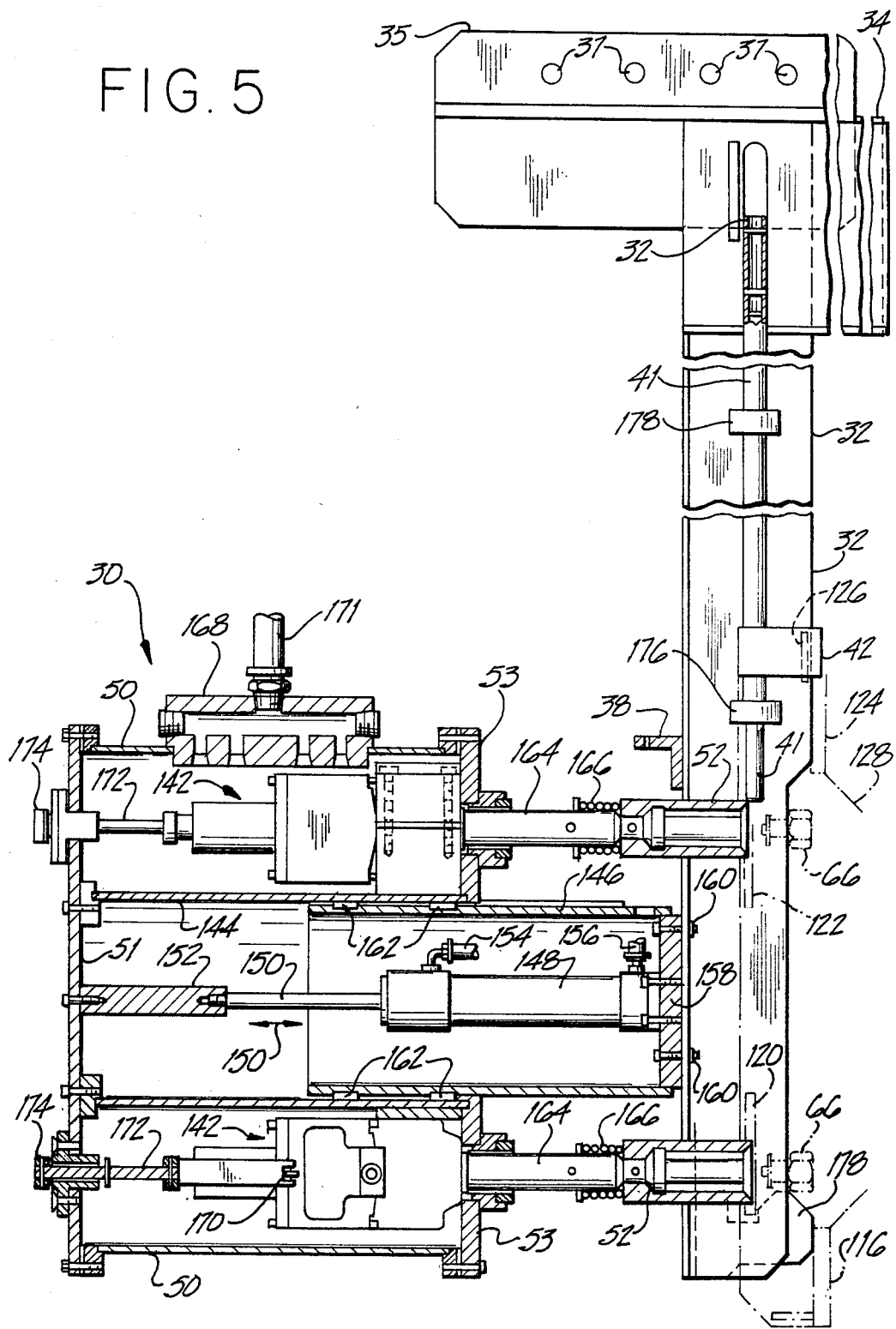
FIG. 5 is a cross-sectional, partially broken-away view of the plug installation device shown in FIGS. 1 and 2; with the section being taken along line 5 of FIG. 2.

The remote installation device or tool 26 is shown in detail in FIG. 5, as well as FIG. 2. FIG. 5 shows certain parts of the plug 28 and its support member 44 in dashed outline so as to illustrate how the tool 26 and plug 28 fit together.

Referring to FIG. 5, secured to the lower end of the vertical beam 32 is a hook 178 which is shaped to fit under the lower edge of the front plate 120 of the plug support member 44. The bottom stop plate 116 serves to stop the inward movement of the hook 178 as it is inserted into position to engage the plate 120.

When attaching the plug 28 to the remote installation device 26, after the hook 178 has been inserted under the edge of the plate 120, the top portions of the installation device and the plug are rotated towards one another with the handle 40 lifted so as to lift the arms 42. Thus, when the two parts have been rotated into contact with one another, the handle 40 is lowered and the arms 42 embrace the side plates 128, as shown in FIG. 4, so as to securely hold the plug 28 and the installation device 26 together. The upper edge of plate 124 serves as a stop to stop the upward movement of the plug 28. Guide members 176 and 178 guide the vertical movement of the handle 40 and rod 41. A locking pin (not shown) is provided for the handle 40 to lock it in each of its raised and lowered positions. The procedure for releasing the plug 28 and installation device 26 from one another is the reverse of the foregoing. Thus, the plug 28 can be releasable secured to or released from the remote installation device. This can be done remotely from the platform 25, without a worker having to descend into the reactor pressure vessel 12.

With the plug and installation device engaged, the nuts 66 on the plug are aligned directly opposite the sockets 52 on the power drive unit 30 which are used to drive the nuts. The nuts 66 are shown in dashed outline in the lower right-hand portion of FIG. 5.

The drive unit 30 has a housing which includes an outer cylindrical wall 50, an inner cylindrical wall 144, a rear wall 51, and an annular front wall 53. Mounted in the housing are four air-driven impact wrenches 142, only two of which are shown in FIG. 5. The impact wrenches 142 are mounted in the space between the outer wall 50 and the inner cylinder 144. Each of the impact wrenches has a shaft 164 which extends outwardly from the housing. A socket 52 is attached to the right end of each shaft 164. A spring 166 is provided to help urge the socket 52 into engagement with the nut 66.

The power drive unit 30 is secured to the beam 32 by means of bolts 160 through an end plate 148 of a central cylinder member 146 which fits into the cylinder 144. The cylinder 144 and the cylinder 146 can slide relative to one another on bearings 162.

Mounted in the cylinder 146 is an air cylinder 148 which drives a piston 150 back and forth in the directions indicated by the arrow 151. The piston is secured to the rear wall 51 of the housing by means of a post 152.

The air cylinder 148 has first and second air lines 154 and 156. Air supplied to the air lines in one direction drives the piston 150 and the air cylinder away from one another, and air pressure applied in the other direction draws the piston into the body of the air cylinder.

When it is desired to engage the sockets 52 with the nuts 66 to seat the plug, the air cylinder 148 is actuated so that the cylindrical housing 144 slides to the right on the housing 146, thus thrusting the sockets 52 onto the nuts 66. Air pressure is supplied from a remote source selectively to each of the air impact wrenches 142 to drive each of the four nuts to a pre-determined desirable tightness to seat the plug 28 in the pipe inlet 22. Air is discharged from the impact wrenches through a manifold 168 and an outlet hose 171.

Each of the impact wrenches is a standard, commercially-available tool such as those made by Ingersol-Rand, Model 1712 B4. Each tool has a reversing mechanism 170. An extension 172 is attached to the mechanism 170 and is extended outside of the rear of the housing. A lever 174 is attached to the extension and provides a means for reversing the direction of the drive. This lever can be actuated to reverse the direction of the wrenches' drive when it is desired to remove the plug, for example.

It should be noted that the housing and all of its openings are made water tight by appropriate seals. This enables the entire drive unit 30 to be operated under water, if necessary. As it has been explained above, this can allow the use of water to give even greater protection for the workers.

Now referring to the upper portion of FIG. 5, extending upwardly from the control unit 34 and secured to the beam 32 is a plate 35 having a plurality of horizontally-spaced holes 37. A hook on a power hoist chain or cable can be inserted through one of the holes 37 for lifting or lowering the units 26 and 28. Several spaced holes 37 are provided to allow the unit to be lifted from a point above the center of gravity of the assembled tool and plug combination, in order to ensure the proper alignment of the plug with the inlet 22.

PNEUMATIC CONTROL SYSTEM FOR INSTALLATION DEVICE

Figure 10:
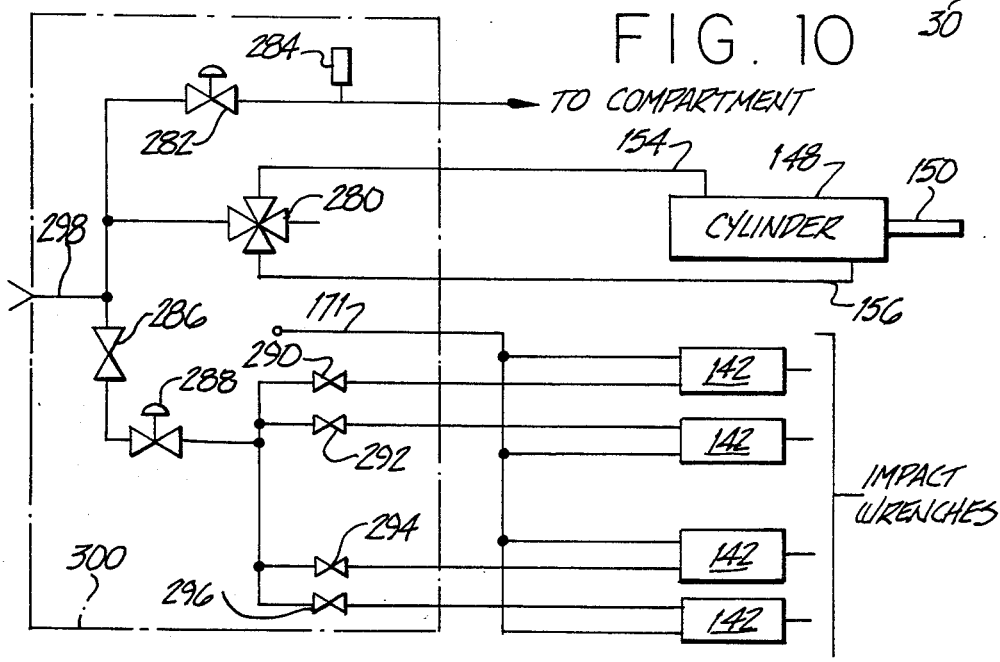
FIG. 10 is a schematic piping diagram used in operating the device of FIG. 5.

FIG. 10 (on the same sheet with FIG. 1) is a schematic diagram of a pneumatic control system for the installation device 26. The control unit 300 includes an inlet 298 for compressed air. Air from the inlet 298 goes through a valve 286 and a regulator 288 to four lines connected in parallel which deliver compressed air through manually-operable ball-type control valves 290, 292, 294 and 296 to each of the impact wrenches 142. The common air return line 171 is provided. This line returns air up to a level above water when the drive unit 30 is operated under water. This prevents water from entering the return line.

Each of the control valves 290, 292, 294 and 296 can be operated manually to control the amount each impact wrench turns the nut which it drives.

Air from the inlet 298 also flows through a line 299 to a 4-way valve 280 by means of which the operator can control the application of air pressure to the inlets 154 and 156 of the air cylinder 148, thus to control the direction of movement of the piston 150, and the engagement or disengagement of the sockets 52 with the nuts 66 on the plug 28.

Compressed air also flows through a regulator 282 through a line 283 protected by a relief valve 284 to the compartment which houses the impact wrenches. This allows the maintenance of a gas pressure inside the compartment which is greater than the liquid pressure outside of it, thus to prevent leakage of water into the compartment.

HYDRAULIC EMBODIMENT

FIGS. 7, 8, 11 and 12 illustrate a hydraulically-operated pipe plug 180 constructed in accordance with the present invention. Many of the components of the plug 180 are the same or substantially the same as parts of the plug 28 shown in FIGS. 1 through 6, and those parts are given the same reference numerals as before.

The plug 180 includes a central rear plate 182, with a relatively thick annular back face plate 184.

Figure 7:
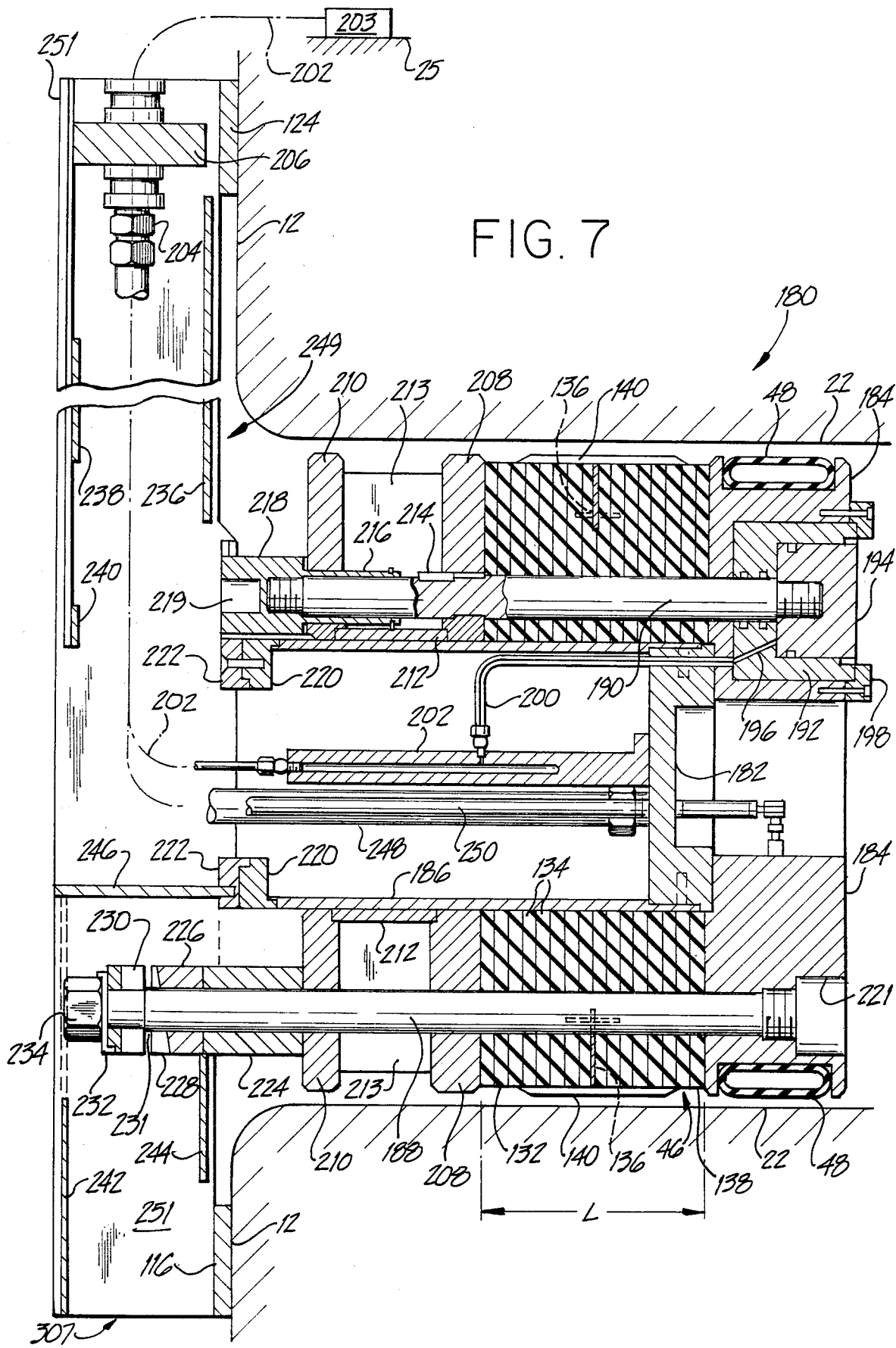
FIG. 7 is a cross-sectional view, taken along line 7—7 of FIG. 8, of an alternative embodiment of the pipe plug of the present invention.

Four locking studs 188 similar to the studs 62 in FIG. 3 are provided. Also, four compression rods 190 are provided for compressing the rubber seal member 46 to seal the plug in place. The rear face plate 184 has four recesses in its rear surface (see FIG. 14). Into each of the recesses is fitted a piston cylinder-forming member 192. Threaded onto the right end of each compression rod 190 is a hydraulic piston 194 dimensioned to slide within the cylinder 192. (Because of the section line used, only one piston is shown in FIG. 7.)

Hydraulic fluid under pressure is supplied through a conduit 196 to the left rear face of the piston 194. The hydraulic fluid is supplied through a line 200, and a conduit 202 which extends up to the platform 25 where workmen can supply pressurized hydraulic fluids from either a hand pump 203 or a motorized pump. Threaded onto the other end of each rod 190 is a nut 218 with a sleeve portion 216 which slides within a hole in an end plate 210. The plate 210 is separated from another plate 208 by a spacer cylinder 212 and by gussetts 213. The plate 208 bears against the left face of the rubber member 46.

An internal cylinder 186 is secured at its right end to the rear central plate 182, and provides a surface against which the parts 210, 208 and the rubber washers can slide during compression and decompression of the rubber member. A pair of retainer rings 220, 222 attach the cylinder at its other end to support structure 249.

When the plug compression mechanism is operated to compress the rubber member 46 to seal the plug 180 into the pipe inlet 22, pressurized hydraulic fluid is supplied to each of the four pistons 194 under relatively high pressures (e.g. 4,000 p.s.i.). This supplies a relatively large amount of force to the piston, and pulls the rod 190 towards the right. This causes the end members 218 to bear against the plate 210 which presses against the plate 208, which causes compression of the rubber 46.

An inflatable rubber seal 48 is provided and is inflated by means of an air supply tube 250, as in the pipe plug 28 described above.

Figure 8:
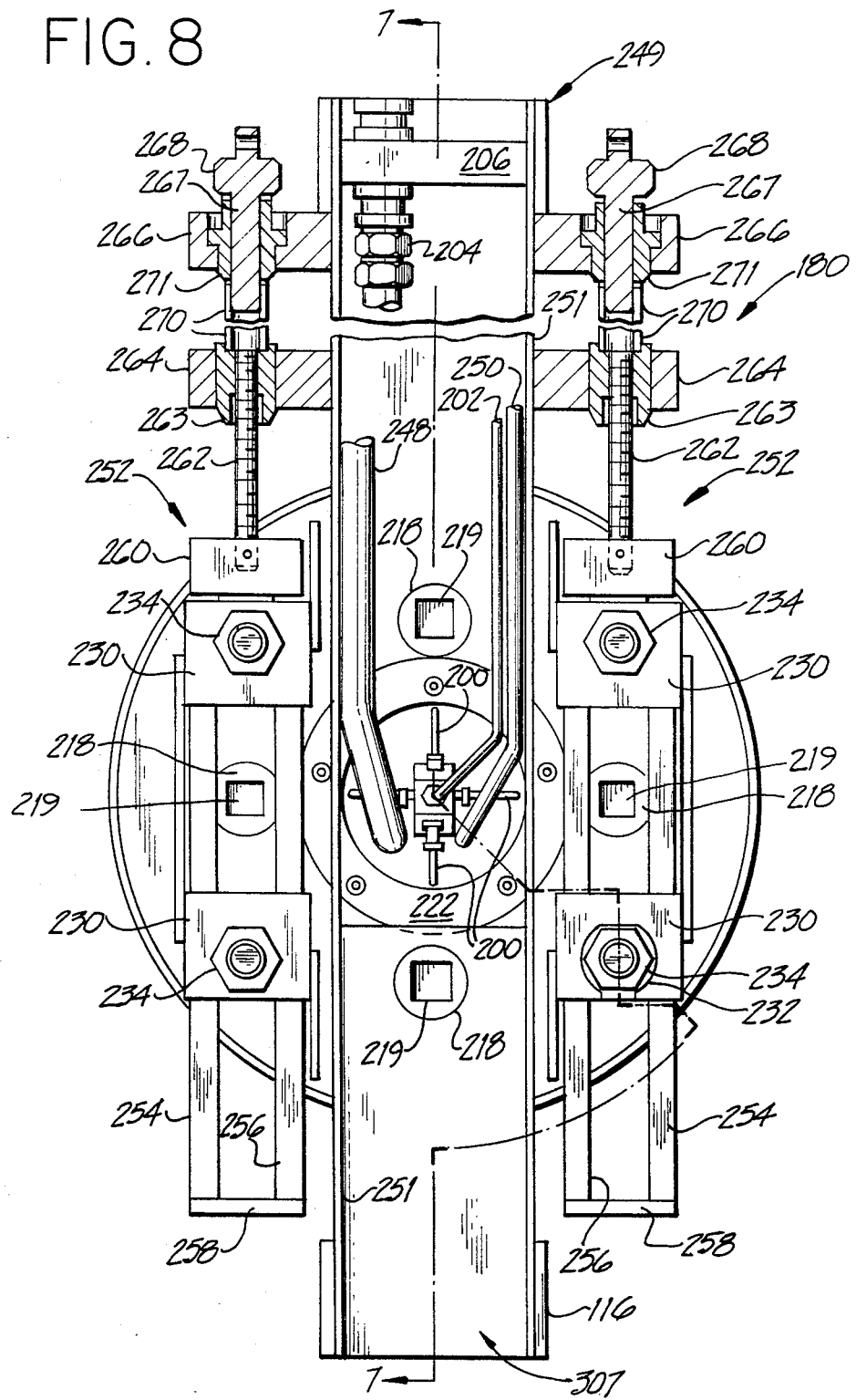
FIG. 8 is an end elevation view of the pipe plug shown in FIG. 7.

Referring now to FIG. 8, as well as FIG. 14, it can be seen that the four hydraulic pistons uses to compress the rubber plug member are spaced symmetrically about the longitudinal center line of the plug. Thus, by the application of hydraulic pressure from a remote source, the plug can be seated and unseated remotely. Each of the end members or nuts 218 has a square hole 219 into which a square socket drive can be inserted to rotate the nut 218 to remove it from rod 190 in an emergency. The rod 190 contains a key 214 to prevent its rotation during rotation of the nut 218.

The locking studs are threaded at their right ends into the material of the rear face plate 184 within recesses 221, and extend through holes in the rubber washers 132, 134 and 138, the plates 208 and 210, and through a spacer member 224 and a fixed wedge member 226. A guide member 230 fits onto the rod end, which is of reduced diameter, and is seated against a shoulder 231 to keep the member 230 at the end of the stud. A nut 234 is threaded onto the end of the stud 188, and is locked in position relative to the member 230 by a bent-over washer 232 to which the nut 234 is welded. Members 224 and 226 are secured to and move with the plate 210.

As it is shown in FIG. 8, the studs 188 and their nuts 234 also are spaced symmetrically with respect to the longitudinal center line of the plug 180, and also with respect to the compression rods and their caps 218. (Only one of the retaining washers 232 is shown in FIG. 8, in order to simplify the drawing).

A vent line 248 is provided for the same purposes as the vent line 102 in FIG. 3. The vent line is connected to a coupling 204 in the upper portion of a plug mounting structure 44 for connection to another line extending to the platform 25.

LOCKING STRUCTURE

Figure 12:
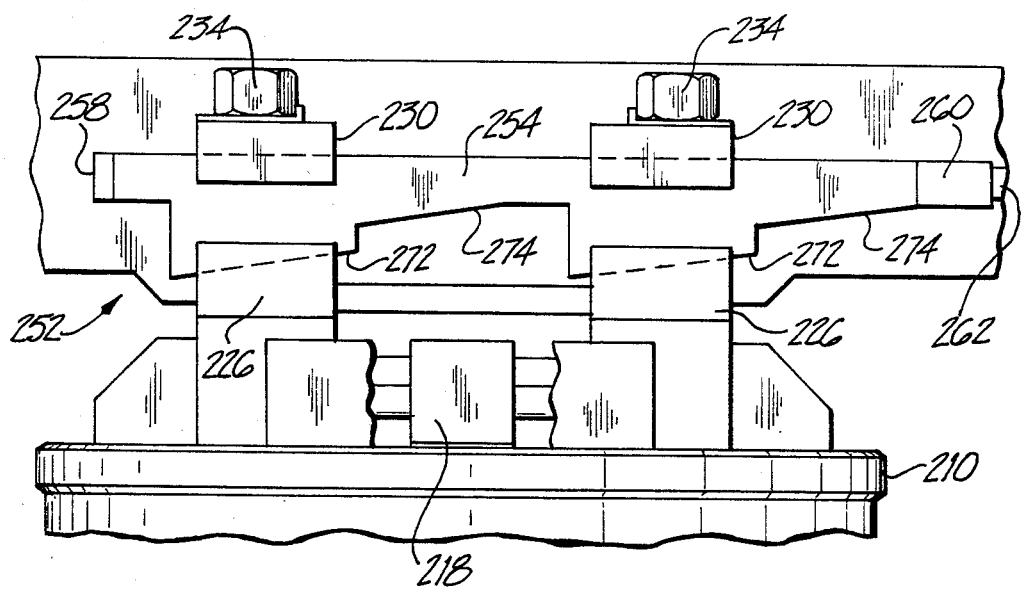
FIG. 12 is a view like that of FIG. 11, but with the locking device in locked position.

In accordance with another aspect of the present invention, a unique mechanism is provided for locking the plug member 46 in its compressed condition. Two locking mechanisms 252 are shown in FIG. 8, and one of them is shown in FIGS. 11 and 12.

The locking mechanism 252 consists of a pair of movable locking wedges 254 and 256 (also see FIGS. 11 and 12) secured together at one end by a cross-bar 258, and secured at the other end to an end member 260. Each of the fixed wedge members 226 (FIG. 7) has a pair of slots 228 each of which is aligned with one of the locking wedge bars 254 and 256 and has an inclined bottom surface. Similarly aligned with the wedge bars 254 and 256 are slots in the upper member 230. Thus, each of the members 230 and 226 has a pair of slots allowing the locking wedges to slide on both sides of each nut 234.

It should be noted that the section lines through the elements 226 and 230 in FIG. 7 are taken at a position considerably farther back than the center of the rod 188 in order to show the slots in those members.

Referring again to FIG. 8, rotatably secured to each of the end pieces 260 is a threaded rod 262 which mates with a threaded nut 263 which is secured to a mounting member 264 which is secured to the beam 251 of a support structure 249. Secured to the threaded nut 263 is an elongated tubular member 270, which is shown broken away in FIG. 8 in order to condense the drawing. However, it extends for a substantial distance to another mounting bracket 266 where a bearing member 271 is mounted. Rotatably mounted in the bearing member 271 is a shaft 267 with a hex nut 268 secured to it.

The nuts are made to be engageable by long socket wrenches extending downwardly from above and rotatable from the platform 25 to operate the locking devices 252.

The locking device 252 operate as follows:

FIG. 11 shows the locking wedge bar 254 with two locking wedge portions 272, and two indented portions 274. FIG. 11 shows the locking studs in the position they take when the rubber seal member is uncompressed. The members 226 and 230 are relatively close together, almost touching.

FIG. 12 shows the studs in the positions the parts take when the rubber seal member is fully compressed. The members 226 and 230 have spread apart by a considerable distance. This is because the element 226 stays with the spacer 22, which is fastened to the plate 210, which moves with the rubber member 46. However, member 230 is secured at the end of the locking stud, and abuts against the shoulder 231 (see FIG. 7) so that it remains in place as the rubber is being compressed.

In order to lock the plug in its compressed condition, the screws 268 (FIG. 8) are driven from a remote location so as to move the wedge member 254 to the right (or upwardly, depending on how one views these figures) as it is shown in FIGS. 11 and 12. Finally, the wedge member is wedged tightly in the position shown in FIG. 12, where it firmly holds the members 230 and 226 apart. Thus, even if a hydraulic pressure line were to fail, or for some other reason the hydraulic compression means would fail to hold the plug in its compressed position, the locking members 252 would do the job. Moreover, the plug can be released simply by reversing the direction of rotation of the nuts 268 so as to loosen the wedges, and reducing the hydraulic pressure, if it has not already been done.

The drive socket 219 in each end member 218 allows the member 218 to be unscrewed if the piston 190 becomes frozen in position and cannot be moved. This will release the plug.

HYDRAULIC PLUG INSTALLATION DEVICE

Referring to FIG. 7 again, the plug 180 has a support structure 249, similar to the structure 44, which cooperates with an installation device 302, shown in FIGS. 13 and 14. The device or tool 302 is much simpler than the tool 26 of FIGS. 1, 3 and 5 because it does not need a motorized driving tool as in the device 26.

Referring now to FIGS. 13 and 14, the installation device 302 includes an elongated beam 304 (FIG. 13) with a plate 306 attached at its lower end and a tapered projection extending upwardly from the plate 306.

A holding bracket 310 with hooked arms 311 is vertically slidably mounted on a bar 313 in a slot 312 in the middle portion of the beam 304. A pair of rods 314 slide in guides 316 secured to the sides of the beam 304 and extend up to adjacent the upper end of the beam where pivoted levers 326 are pivotably attached at 328. By pulling down on the levers 326, the rods 314 and the bracket 310 can be raised, and by releasing the levers, the bracket 310 can be lowered.

At the top of the beam 304 are secured a support plate 332 with plural holes 334 by means of which the device 302 can be suspended from a hoist. The plate 332 is secured to a horizontal plate 320 which is secured to vertical bracing plates 336 which are secured to the beam 304.

The installation device 302 also includes a pair of rods 318 rotatably supported by brackets 320 and 321, with a crank 324 at the upper end and a drive socket 322 at the lower end.

In use, the installation device 302 is positioned with the projection 308 beneath the rectangular opening 307 (FIGS. 7 and 8) formed between the side walls of the beam 251 of the support structure 249, and the plates 242 and 116.

With the vertical centerline of the tool 302 and the vertical centerline of the support structure 249 inclined away from one another, and with part 308 underneath the receptacle 307, the tool 302 is lifted so that the projection 308 enters the receptacle 307, and fits securely in place. Then the top of the tool 302 and the support structure 249 are rotated together, with the bracket 310 and rods 318 lifted. Then, the bracket 310 is dropped so that the hooked arms 311 hook onto the bracket 266 to lock the tool 302 and the plug 180 together.

Then, if the plug 180 is being installed in the steam line inlet 22, the plug and tool 302 are lowered to inlet 22 and the plug is inserted. After the application of hydraulic pressure to tighten the plug in place, the rods 318 are lowered to engage the sockets 322 with the nuts, and the cranks 324 are turned to pull up the wedge bars 254 to lock the plug in its seated condition. The tool 302 then can be removed, and the hydraulic pressure removed, if desired.

The procedure for removal of the plug is substantially the reverse of the foregoing.

It should be noted that the top of the beam 304 extends four or five feet above the flange 23 of the pressure vessel 12. One of the reactor vessel studs 31 (which are not shown in FIG. 1) is shown for the sake of perspective.

The hydraulic plug embodiment has several advantages over prior plugs. In addition to the advantages described above for the plug 28, it has the advantage that it does not need a separate power tool like the tool 30 which is used with the plug 28. The seating tool is built into each plug. Moreover, the plug 180 is particularly well suited for use in pipes of relatively large diameter, such as 24 inches, since the use of hydraulic pistons considerable increases the mount of compression force available over that available with the impact wrenches used in embodiment of FIGS. 1 through 6.

The plug 180 can be operated under water after the hydraulic pressure has been removed for a relatively long period of time (e.g., three months), a typical mode of operation. That is done easily because the actuating mechanism is integral with the plug, and the hydraulic pressure lines extend up to the platform 25 at all times. All that need be done is to connect up the pump 203 to the hydraulic lines and operate it.

The locking device 252 is particularly advantageous in that the locking motion is vertically up and down, so that it can be operated easily by a worker above on the platform 25. If a wedge bar becomes struck, a sharp downward blow will loosen it easily.

Of course, it should be recognized that the remote compression indicators described above also can be used with the hydraulic plug 180.

RELATIVE DIMENSIONS OF RUBBER PLUG MEMBER

The volume of the rubber plug member 46 (FIGS. 3 and 7) has been found to be a relatively significant parameter of the plug 28. As the diameter of the steam lines in boiling water reactors increases, so does the tendency of the pipe to deviate from a true cylinder. Thus, the spaces between the un-compressed plug and the pipe inlet walls 22 tend to vary more widely with larger diameters. The larger that space is, the more the rubber must be compressed simply to fill the space, and the less compression force will be available to hold the plug in place.

Although the space can be filled by compressing the rubber more, a feature of this invention is the realization that this often will not be successful because it takes disproportionally greater forces to compress the rubber beyond a pre-determined level, so much so that there may not be enough compressive force available to hold the plug in place against the pressure forces tending to unseat it.

Under extreme circumstances this could mean that the plug would be blown out of the pipe by the high pressure in the pipe. Alternatively, the threads on the studs 62 (FIG. 3) might strip, or various parts of the compression mechanism might break in the attempt to compress the rubber enough to hold the plug in place. The following explanation may help in understanding the problem.

The relationship between the degree of compression of the plug member and the force required to produce that compression is believed to be accurately expressed by the following equation:

$$F = -G(\lambda - 1/\lambda^2)S$$

Where
$F$ = force, in pounds per square inch
$G$ = modulus of elasticity for the type of rubber used λ = degree of compression; the ratio of the compressed length to the free length of the rubber;

S = is a form factor which depends on the shape of the rubber body.

As one can see from the above equation, as the degree of compression increases, the force required increases exponentially.

The tensile strength of the studs 62 or the threads thereon, and the pistons 190 all are listed. As the space between the plug and the pipe wall increases, the degree of compression needed to fill the space increases too. Each such increase decreases the amount of strength left in the bolts, threads, etc., for producing holding forces, but decreases it at an exponential rate.

Another feature of this invention is the recognition that the ratio of compressive forces used to hold the plug in place to that used to fill the spaces between the plug and the pipe wall can be maintained relatively stable, despite pipe diameter variations, by the simple expedient of increasing the length L of the rubber member 46. This increases the amount of rubber expansion available to fill the spaced without decreasing the forces left for holding the plug in place.

Because the steam lines in reactors are relatively large (e.g., 15 inches to 24 inches in diameter), the forces which must be resisted are relatively large, and the forces on the studs or pistons used to supply the plug holding forces are similarly large. Therefore, it is preferred to keep the rubber compression force needed to fill the space between the plug and the pipe wall below 20% of the total compression force needed.

Because of the exponential rise in the force needed to compress the rubber, it is preferred to keep the degree of compression (λ) required to produce the full holding force desired to no less than 75% to 80%, and preferably higher. However, in order to make it possible to use the same diameter plug despite relatively wide variations in the pipe size from nominal values, and in order to prevent the plug from becoming too costly, the degree of compression should not be made too high. Therefore, the degree of compression (λ) should vary between approximately 75% and 90%, the preferred range being 83% to 85%.

It has been found that the annular shape of the rubber plug member 46 is advantageous. It requires considerably less force to compress it than would a solid rubber cylinder. However, a substantial radial thickness of the annulus should be maintained in order to ensure adequate material to fill the spaces. In general, the thickness of the annulus should increase with the increasing diameter of the pipe.

Following are typical examples of the dimensions of the rubber plug member 46 for different typical pipe diameters:

| Pipe Diameter | Length "L" | Radial Thickness |
|---|---|---|
| 15 in. | 6 in. | 5 in. |
| 24 in. | 8 in. | 7 in. |

MATERIALS

The majority of the metallic components of the plug 28 are made of aluminum. Aluminum is desirable because it is light-weight, corrosion-resistant, and has sufficient strength. The rubber members 46 and 48 are made of EPDM rubber. The rubber of the inflatable seal 48 is fabric-reinforced. However, the plates or shoes 140 are made of stainless steel, as is the release plate 74. The studs 62 and nuts 66 are made of chrome-plated carbon steel. The studs 188, pistons 194 and rods 190 are made of stainless steel.

The above description of the invention is intended to be illustrative and not limiting. Various changes or modifications in the embodiments described may occur to those skilled in the art and these can be made without departing from the spirit or scope of the invention.

I claim:

1. In combination with the steam line of the reactor vessel of a boiling water reactor, the reactor vessel having an open top and an upper edge, and having isolation valves in said steam line to be tested under pressure, said steam line having an entrance portion with an internal side wall surface, a plug device in said entrance portion, said plug device comprising, in combination, a plug member made of resilient material which, when compressed in one direction, expands in a direction transverse to said one direction, said plug member being elongated in said one direction and having an external surface with a shape generally conforming to the shape of said internal side wall surface, a pair of relatively rigid end members, each being positioned at one end of said plug member, compression means comprising a plurality of axial compression rods spaced circumferentially adjacent said external surface of said plug member for urging said end members towards one another so as to compress said plug member in said one direction, and thus cause it to engage and form a seal with said internal side wall surface, and gripper means to engage said internal side wall surface to help hold said plug member in said entrance portion, said gripper means including a plurality of relatively rigid shoes secured to the exterior of said plug member at locations around the periphery of said plug member, the external shape of said shoes conforming to the shape of said internal side wall surface.

2. Apparatus as in claim 1 in which the lengths of said shoes in said one direction are substantially less than the length of said plug member in said one direction so that the material of said plug member can bulge outwardly under the force of said compression means to make contact with said internal side wall surface.

3. A device as in claim 1 in which said reactor vessel has an internal wall and said entrance portion has an entrance opening which is substantially flush with said internal wall of said reactor vessel.

4. Apparatus as in claim 1 in which said plug member is annular, a cylindrical axial support, said annular plug member extending around said support, said plug member being made of a plurality of rubber rings stacked axially together.

5. Apparatus as in claim 1 including anchors imbedded in the material of said plug member and secured to said shoes to anchor said shoes to said plug member.

6. In combination with the steam line of the reactor vessel of a boiling water reactor, the reactor vessel having an open top and an upper edge, and having isolation valves in said steam line to be tested under pressure, said steam line having an entrance portion with an internal side wall surface, a plug device in said entrance portion, said plug device comprising, in combination, a plug member made of resilient material which, when compressed in one direction, expands in a direction transverse to said one direction, said plug member being elongated in said one direction and having an external surface with a shape generally conforming to the shape of said internal side wall surface, a pair of relatively rigid end members, each being positioned at one end of said plug member, compression means comprising a plurality of axial compression rods spaced circumferentially adjacent said external surface of said plug member for urging said end members towards one another so as to compress said plug member in said one direction, and thus cause it to engage and form a seal with said internal side wall surface, and gripper means to engage said internal side wall surface to help hold said plug member in said entrance portion, said entrance portion being substantially horizontal, and including support means for extending above said upper edge of said reactor vessel for supporting said plug in a substantially horizontal alignment for insertion into said entrance portion at a location spaced downwardly from said upper edge, said support means including a support member secured to and extending outwardly from one of said end members.

7. In combination with the steam line of the reactor vessel of a boiling water reactor, the reactor vessel having an open top and an upper edge, and having isolation valves in said steam line to be tested under pressure, said steam line having an entrance portion with an internal side wall surface, a plug device in said entrance portion, said plug device comprising, in combination, a plug member made of resilient material which, when compressed in one direction, expands in a direction transverse to said one direction, said plug member being elongated in said one direction and having an external surface with a shape generally conforming to the shape of said internal side wall surface, a pair of relatively rigid end members, each being positioned at one end of said plug member, compression means comprising a plurality of axial compression rods spaced circumferentially adjacent said external surface of said plug member for urging said end members towards one another so as to compress said plug member in said one direction, and thus cause it to engage and form a seal with said internal side wall surface, and gripper means to engage said internal side wall surface to help hold said plug member in said entrance portion, including remote actuating means for actuating said compression means from a location above said upper edge of said reactor vessel.

8. Apparatus as in claim 7 in which said compression means includes a plurality of threaded, elongated bolts and nuts, said remote actuating means including a driving unit having a plurality of wrenches and at least one motor to drive said wrenches, there being one wrench for each of said nuts, means for holding said wrenches in alignment with said nuts, means for engaging each wrench with one of said nuts, and means for operating said motor.

9. Apparatus as in claim 7 including remote indicating means for indicating the degree of compression of said plug member.

10. In combination with the steam line of the reactor vessel of a boiling water reactor, the reactor vessel having an open top and an upper edge, and having isolation valves in said steam line to be tested under pressure, said steam line having an entrance portion with an internal side wall surface, a plug device in said entrance portion, said plug device comprising, in combination, a plug member made of resilient material which, when compressed in one direction, expands in a direction transverse to said one direction, said plug member being elongated in said one direction and having an external surface with a shape generally conforming to the shape of said internal wall surface, a pair of relatively rigid end members, each being positioned at one end of said plug member, compression means comprising a plurality of axial compression rods spaced circumferentially adjacent said external surface of said plug member for urging said end members towards one another so as to compress said plug member in said one direction, and thus cause it to engage and form a seal with said internal side wall surface, and gripper means to engage said internal side wall surface to help hold said plug member in said entrance portion, said compression rods extending between said end members, and including means for moving one of said end members along said rods towards and away from the other of said end members, stop members on said rods, at lease one release member for bearing against said one end member and said stop members, said release member being movable to a release position in which it does not engage said stop members and relieves the compressive forces previously applied to said plug member by said compression means.

11. Apparatus as in claim 10 in which said release member includes means remotely engageable for moving said release member to said release position.

12. In combination with the steam line of the reactor vessel of a boiling water reactor, the reactor vessel having an open top and an upper edge, and having isolation valves in said steam line to be tested under pressure, said steam line having an entrance portion with an internal side wall surface, a plug device in said entrance portion, said plug device comprising, in combination, a plug member made of resilient material which, when compressed in one direction, expands in a direction transverse to said one direction, said plug member being elongated in said one direction and having an external surface with a shape generally conforming to the shape of said internal side wall surface, a pair of relatively rigid end members, each being positioned at one end of said plug member, compression means for urging said end members towards one another so as to compress said plug member in said one direction, and thus cause it to engage and form a seal with said internal side wall surface, including remote actuating means for actuating said compression means from a location above said upper edge of said reactor vessel, in which said compression means includes a plurality of threaded, elongated bolts and nuts, said remote actuating means including a driving unit having a plurality of wrenches and at least one motor to drive said wrenches, there being one wrench for each of said nuts, means for holding said wrenches in alignment with said nuts, means for engaging each wrench with one of said nuts, and means for operating said motor, including remote support means for remotely supporting said plug and driving unit in alignment with said pipe for insertion of said plug in said pipe, said remote support means comprising a support member secured to one of said end members, an elongated beam with said driving unit secured thereto at one end, and fastening means for releasably securing said support means to said beam.

13. A device as in claim 12 in which said fastening means includes a rod vertical slidably secured to said beam, said rod having a handle adjacent the end of said beam opposite said one end, and means for engaging said support member at two separate positions, said rod being movable to effect the engagement at one of said positions.

14. In combination with the steam line of the reactor vessel of a boiling water reactor, the reactor vessel having an open top and an upper edge, and having isolation valves in said steam line to be tested under pressure, said steam line having an entrance portion with an internal side wall surface, a plug device in said entrance portion, said plug device comprising, in combination, a plug member made of resilient material which, when compressed in one direction, expands in a direction transverse to said one direction, said plug member being elongated in said one direction and having an external surface with a shape generally conforming to the shape of said internal side wall surface, a pair of relatively rigid end members, each being positioned at one end of said plug member, compression means for urging said end members towards one another so as to compress said plug member in said one direction, and thus cause it to engage and form a seal with said internal side wall surface, including remote indicating means for indicating the degree of compression of said plug member, in which said compression means includes a plurality of axial compression rods spaced circumferentially adjacent said external surface of said plug member, said remote indicating means including a plurality of transducers, one mounted adjacent each of said rods, for detecting the axial compression produced separately by each rod, converting said compression into a signal, and displaying a corresponding indication at a remote location.

15. A pipe plug device comprising, in combination, a plug member made of resilient material which, when compressed in one direction, expands in a direction transverse to said one direction, said plug member being elongated in said one direction and having a rounded sealing surface, a pair of relatively rigid end members, each being positioned at one end of said plug member, a plurality of relatively rigid gripper shoes secured to said plug member adjacent said sealing surface at locations around the periphery of said plug member, anchors imbedded in the material of said plug member and secured to said shoes to anchor said shoes to said plug member and compression means for urging said end members towards one another so as to compress said plug member in said one direction.

16. A device as in claim 15 in which said shoes extend outwardly from said sealing surface when said plug member is not compressed, and in which the lengths of said shoes in said one direction are substantially less than the length of said plug member in said one direction so that the material of said plug member can bulge outwardly under the compression of said compression means to make sealing contact with and seal the internal wall of a pipe with which said shoes make contact when said pipe plug device is in a pipe.

17. A device as in claim 15 in which said plug member is annular, a cylindrical axial support, said annular plug member extending around said support, said plug member being made of a plurality of rubber rings stacked axially together.

18. A device as in claim 15 in which said compression means comprises a plurality of bolts and nuts, each of said bolts extending through the material of said plug member and being secured at one of its ends to one of said end members and having a nut at the end opposite said one end, said nut bearing against the other end member.

19. A plug device as in claim 15 in which there is a space between said plug member and the internal wall of a pipe to be plugged by said plug member when said plug member is uncompressed in said one direction, said compression means being adapted to apply a predetermined holding force to said internal side wall surface to hold said plug in place under dislodging pressure, the amount of compression force required to fill said space is less than approximately twenty percent of the total compression force needed to produce said holding force.

20. A plug device as in claim 15, said compression means being adapted to apply a predetermined holding force to the internal wall of a pipe to be plugged by said plug member to hold said plug in place under dislodging pressure, the dimensions of said plug member being such that the degree of compression of said plug member needed to produce said holding force is limited to a range of from approximately seventy-five percent to approximately ninety percent.

21. Apparatus as in claim 15 in which said plug member is in the form of a cylinder which has a substantial wall thickness, and including means for restraining said plug member so as to substantially prevent lateral bending of said wall when said plug member is compressed by drawing said end plates together.

22. A remote installation and removal tool for installing pipe plugs in reactor vessels having elongated steam lines, said plugs having one or more axially-extending bolts and nuts to be tightened or loosened to seal or unseal the plugs, said tool comprising an elongated beam of sufficient length to reach one of said steam lines from above and outside of said vessel, a power-driven wrench mounted adjacent one end of said beam, fastening means adapted for releasably fastening one of said plugs to said beam with said bolt in alignment with said nut and extending transversely of said beam, and remotely controllable means for energizing said wrench to rotate said nut.

23. A device as in claim 22 in which said wrench has a nut-engaging driving member, and including remotely-controlled means for moving said nut-engaging driving member of said wrench into and out of engagement with said nut.

24. A remote installation and removal tool for installing pipe plugs in reactor vessels having elongated steam lines, said plugs having one or more axially-extending bolts and nuts to be tightened or loosened to seal or unseal the plugs, said tool comprising an elongated beam, a power-driven wrench mounted adjacent one end of said beam, fastening means for releasably fastening one of said plugs to said beam with said bolt in alignment with said nut, and remotely controllable means for energizing said wrench to rotate said nut including an elongated support member at one end of said plug, fastening means for engaging said beam with said support member at a first position adjacent said one end of said beam, and remotely-operable means including a member slidable longitudinally of said beam for engaging said support member at a second position spaced upwardly from said first position.

25. A device as in claim 24 in which said support member has an upper end and a lower edge, said fastening means including an up-turned hook member secured to said beam for hooking under said edge, the upper end of said support member being adapted to receive a slide fastener secured to said slidable member.

26. A remote installation and removal tool for installing pipe plugs in reactor vessels having elongated steam lines, each of said plugs having a plurality of axially-extending bolts and nuts to be tightened or loosened to seal or unseal the plug, said tool comprising an elongated beam, a plurality of compressed air-driven socket wrenches with drive sockets mounted in said housing, fastening means for releasably fastening one of said plugs to said beam with said bolts in alignment with said nuts, and remotely controllable means for energizing said wrenches to rotate said nuts, a compressed air line extending from said wrenches to a remote control location, and air-cylinder means mounted in said housing and connected to said air line for moving said drive sockets of said wrenches into and out of contact with said nuts.

27. A device as in claim 26 in which each of said wrenches has a direction-reversing mechanism extending outside of said housing.

28. In combination, a pipe having pre-determined inside dimensions and a pipe plug adapted to withstand a pre-determined pressure when plugging said pipe, said pipe plug having an elongated plug member of resilient, flexible rubber, a pair of end plates, said member being mounted between said end plates, said plug member having an exterior shape conforming to the inside of said pipe, but having outside dimensions substantially less than said inside dimensions of said pipe, means for drawing said end plates together so as to compress said plug member axially and cause it to fill said pipe and apply a pre-determined holding force to the inside wall of said pipe to hold said plug in place under said predetermined pressure, the dimensions of said plug member being such that the degree of compression of said plug member needed to produce said holding force is limited to a range of from approximately seventy-five percent to approximately ninety percent, said plug member having the form of a cylinder which has a substantial wall thickness, and including means for restraining said plug member so as to substantially prevent lateral bending of said wall when said plug member is compressed by drawing said end plates together.

29. Apparatus as in claim 28 in which the amount of compression force required to fill the space between said plug member and said pipe wall is less than approximately twenty percent of the total compression force needed to produce said holding force.

30. Apparatus as in claim 28 in which said range is from approximately eighty-three percent to approximately eighty-five percent.

31. Apparatus as in claim 28 in which said plug member comprises a cylindrical body made of annular rubber rings stacked side-by-side on a stiff cylindrical central form.

32. In combination with the steam line of the reactor vessel of a boiling water reactor, the reactor vessel having an open top and an upper edge, and having isolation valves in said steam line to be tested under pressure, said steam line having an entrance portion with an internal side wall surface, a plug device in said entrance portion, said plug device comprising, in combination, a plug member made of resilient material which, when compressed in one direction, expands in a direction transverse to said one direction, said plug member being elongated in said one direction and having an external surface with a shape generally conforming to the shape of said internal side wall surface, a pair of relatively rigid end members, each being positioned at one end of said plug member, compression means comprising a plurality of axial compression rods spaced circumferentially adjacent said external surface of said plug member for urging said end members towards one another so as to compress said plug member in said one direction, and thus cause it to engage and form a seal with said internal side wall surface, and gripper means to engage said internal side wall surface to help hold said plug member in said entrance portion, said compression means being adapted to apply a pre-determined holding force to said internal side wall surface to hold said plug in place under dislodging pressure, the dimensions of said plug member being such that the degree of compression of said plug member needed to produce said holding force is limited to a range of from approximately seventy-five percent to approximately ninety percent.

33. In combination with the steam line of the reactor vessel of a boiling water reactor, the reactor vessel having an open top and an upper edge, and having isolation valves in said stem line to be tested under pressure, said steam line having an entrance portion with an internal side wall surface, a plug device in said entrance portion, said plug device comprising, in combination, a plug member made of resilient material which, when compressed in one direction, expands in a direction transverse to said one direction, said plug member being elongated in said one direction and having an external surface with a shape generally conforming to the shape of said internal side wall surface, a pair of relatively rigid end members, each being positioned at one end of said plug member, compression means comprising a plurality of axial compression rods spaced circumferentially adjacent said external surface of said plug member for urging said end members towards one another so as to compress said plug member in said one direction, and thus cause it to engage and form a seal with said internal side wall surface, and gripper means to engage said internal side wall surface to help hold said plug member in said entrance portion, there being a space between said plug member and said internal side wall surface when said plug member is uncompressed in said one direction, said compression means being adapted to apply a predetermined holding force to said internal side wall surface to hold said plug member in place under dislodging pressure, the amount of compression force required to fill said space is less than approximately twenty percent of the total compression force needed to produce said holding force.

* * * * *